United States Patent [19]

Williams et al.

[11] 4,041,135
[45] Aug. 9, 1977

[54] PRODUCTION OF HIGH CAPACITY INORGANIC CRYSTALLINE BASE EXCHANGE MATERIALS

[75] Inventors: Lloyd E. Williams, Bel Air; Robert K. Mays, Havre de Grace; Joseph E. Wagner, III, Abingdon, all of Md.

[73] Assignee: J. M. Huber Corporation, Locust, N.J.

[21] Appl. No.: 599,232

[22] Filed: July 25, 1975

[51] Int. Cl.² .................. C01B 33/28; C11D 9/18
[52] U.S. Cl. ............................. 423/329; 252/131; 252/135; 423/328
[58] Field of Search ............... 423/329, 330, 328; 252/455 Z, 89 R, 131, 135; 106/288 B

[56] References Cited

U.S. PATENT DOCUMENTS

| | | | |
|---|---|---|---|
| 2,882,243 | 4/1959 | Milton | 423/328 |
| 3,058,805 | 10/1962 | Weber | 423/328 |
| 3,071,434 | 1/1963 | Frilette et al. | 423/329 |
| 3,310,373 | 3/1967 | Johnson | 423/329 |
| 3,313,594 | 4/1967 | Wilson | 423/329 |
| 3,481,699 | 12/1969 | Domine et al. | 423/328 |
| 3,574,539 | 4/1971 | Domine et al. | 423/328 |
| 3,692,475 | 10/1972 | Johnson | 423/329 |
| 3,962,116 | 6/1976 | Bloching et al. | 106/288 B X |
| 3,985,669 | 10/1976 | Krummel et al. | 252/131 X |

FOREIGN PATENT DOCUMENTS

| | | | |
|---|---|---|---|
| 2,433,485 | 2/1975 | Germany | 252/131 |
| 1,232,429 | 5/1971 | United Kingdom | 423/329 |

*Primary Examiner*—Edward J. Meros
*Attorney, Agent, or Firm*—Robert L. Price; Harold H. Flanders

[57] ABSTRACT

A method is disclosed for producing inorganic crystalline base exchange materials having high total exchange capacities and specific initial exchange rates which yield well-defined residual concentrations for the elements of Group II of the Periodic Table. The method of the invention includes the concept of controlling the rate of the addition of the reactants and other reaction variables to prevent gel structure formation and to provide a precipitate of discrete particles with a preoriented array of the elements that is predisposed to the final crystalline structure. Recycle of the mother liquor to provide a totally closed system is further disclosed. By preventing the formation of the gel structure it is possible to eliminate cumbersome and costly processing steps and equipment. By varying the precipitation and crystallation conditions, it is possible to control the ultimate crystal size. Recycle allows recovery of the chemical values of the mother liquor and reduces manufacturing cost. Throughput is also significantly increased. Specific and significant process steps include: make-up of the reactants, purification purge of the reactants, precipitation, crystallization, decanting and quench, solids separation and recycle of the mother liquor to provide the closed system. Recycling includes concentration and desalination. The method of the invention further includes particularly unique processing steps comprising solids separation and countercurrent washing.

20 Claims, 5 Drawing Figures

CH-246-41-1     |⎯⎯⎯⎯⎯|
                 5 microns

CH-246-44-1  |—————|
              5 microns

CH-246-45-1

5 microns

CH-52-73  5 microns

PRODUCTION OF HIGH CAPACITY INORGANIC CRYSTALLINE BASE EXCHANGE MATERIALS

REFERENCE TO RELATED APPLICATIONS

This application is related to U.S. application Ser. No. 621,314, filed Oct. 10, 1975, which is a continuation-in-part of Ser. No. 522,375, filed Nov. 8, 1974, and Ser. No. 622,585, filed Oct. 15, 1975, which is a divisional application of Ser. No. 522,375, filed Nov. 8, 1974.

BACKGROUND OF THE INVENTION

1. Field of the Invention

The present invention relates to synthetic inorganic crystalline base exchange materials. More particularly, the invention relates to a process for synthesizing crystalline base exchange materials of specific crystal sizes and having high total exchange capacities and specific initial exchange rates which yield well-defined residual concentrations for the elements of Group II of the Periodic Table. It is important to note that the exchange kinetics of products produced in accordance with the present invention occur effectively at low concentrations of the base exchange material.

2. The Prior Art

Cation exchange materials, and their use in many areas, are well known in the art. While many products are known to possess exchange properties, alumino silicates of the zeolitic type are known to exhibit preferences for particular types or sizes of molecules so that they are highly suitable for separation and exchange purposes. For example, all or a portion of the sodium normally contained in a typical zeolite structure may undergo exchange with a number of various other cations.

At the present time there are a number of commercially available and known alumino-silicate crystalline base exchange materials which may be represented by the general formula.

$$M_{2/n}O:Al_2O_3:XSiO_2:YH_2O$$

wherein M represents a cation; $n$ represents the valence of the cation; X, the moles of the $SiO_2$; and Y, the moles of the $H_2O$. Specific examples of synthetic aluminum silicates are disclosed in U.S. Pat. Nos. 2,882,243; 2,962,355; 3,010,789; 3,012,853; 2,882,244; and 3,130,007.

Notwithstanding the fact that there are such known and commercially available crystalline products, to a large extent processes for producing synthetic exchange products are of the batch type and are limited by the inherent disadvantages associated therewith. Efforts to develop commercially feasible continuous systems or economical batch-type systems have been seriously hampered by the formation of a gel structure during the reaction cycle. Because of the formation of the gel, very cumbersome and costly processing steps and equipment are required. Also, in such processes there may be a carry-over of the gel in the final crystalline product. The gel is an inert diluent and impurity which seriously reduces the specific or unit volume capacity of the product. There is no known method for separation of this gel contaminant. The present invention overcomes such disadvantages of the prior art.

SUMMARY OF THE INVENTION

In summary, the present invention relates to the production of synthetic inorganic crystalline base exchange alumino silicates of specific crystal sizes and having high total exchange capacities. The products of the invention not only have high total exchange capacities, but have specific initial exchange rates and which yield well-defined residual concentrations for the elements of Group II of the Periodic Table. It is important to note that the exchange kinetics of products produced in accordance with the present invention occur effectively at low concentrations of the base exchange material. The present invention is further directed to an improved process for producing inorganic crystalline base exchange materials while providing significant reductions in operating costs.

In its broadest aspects the method of the invention embodies the concept of preventing the formation of a gel structure to provide a precipitate of discrete particles having a preoriented array of the elements that are predisposed to the final crystalline structure. The method of the invention also involves unique processing steps, including recycle of the mother liquor to provide a totally closed system. Recycle allows recovery of the chemical values of the mother liquor and serves to reduce manufacturing costs. Recycle also eliminates ecology problems associated with process effluents.

Specific process steps of the instant invention include (a) make-up of the reactants, (b) purification of the reagent supplying the alumina source prior to its use in the reaction, (c) precipitation of an amorphous intermediate material under controlled conditions to prevent gel formation, (d) static and/or dynamic crystallization, (e) decanting and quench, (f) solids separation, and (g) recycle of the mother liquor. Recycle includes concentration and desalination. In accordance with a particularly advantageous method embodiment, the product is recovered and the mother liquor recycled by way of particularly effective solids separation and countercurrent washing steps.

The process of the invention involves carefully controlled precipitation and crystallization conditions which obviate the commercial practice involving the formation of a gel, ambient aging, and crystallation. Gel structure is prevented in the practice of the present invention. Critical precipitation conditions include the chemical composition and concentration of the reactants, the precipitating temperature, precipitation pH, the sequence and rate of the addition of the reactants, and the mixing intensity during the precipitation. In the practice of the invention, the sequence of the addition of the reactants is also critical to the extent that the reactants may not be simply admixed, as in known gelation processes, but must be controlled in a manner such that the proportions of the individual reactive ionic species in the reaction zone have a predetermined concentration range.

The products of the invention have high ion exchange capacities and, thus, would have a broad spectrum of use areas where certain cations must be removed from process or effluent streams without interfering with the ecological balance of natural waters. For example, many attempts have been made to remove phosphates from washing or cleaning processes in order to prevent eutrophication of natural waters; i.e., an increase of algae growth and oxygen consumption. The product of this invention can be used as a phosphate replacement in all materials used in washing or cleaning processes. Although insoluble in water, the materials of the invention soften hard water and enhance the cleaning action of a detergent system. Because of their fine crystal size, they are effectively washed out or removed during any rinsing cycle. The crystalline alumino silicates of the invention consist of synthetic matter of a mineral nature not requiring oxygen for biological decomposition and settle out gradually in purification plants or natural waters.

It is accordingly a broad object of this invention to provide a process for synthesizing inorganic crystalline base exchange materials.

A further object is to provide inorganic crystalline base exchange materials having high total exchange capacities and specific initial exchange rates which yield well-defined residual concentrations for the elements of Group II of the Periodic Table.

Yet another object is to provide a commercially attractive process for producing synthetic alkali metal alumino silicates for use in all cleaning and/or washing processes requiring hardness sequestering.

An additional object is to provide a commercially attractive process for producing synthetic alkali metal alumino silicates for the removal of trace metals from effluents, from waste treatment plants, and industrial processes.

An additional object is to provide a commercially attractive process for the removal of trace metals in water purification processes.

The manner in which the above and further objects are achieved in accordance with the invention will be better understood in view of the following detailed description and drawings, which form a part of the specification.

BRIEF DESCRIPTION OF THE DRAWINGS

In order to facilitate the understanding of the present invention, reference will now be made to the appended drawings and figures relating to the preferred embodiments of the present invention. The drawings and figures are not to be construed as limiting the invention but are exemplary only.

In the drawings.

DESCRIPTION OF PREFERRED EMBODIMENT(S)

Figure 1:
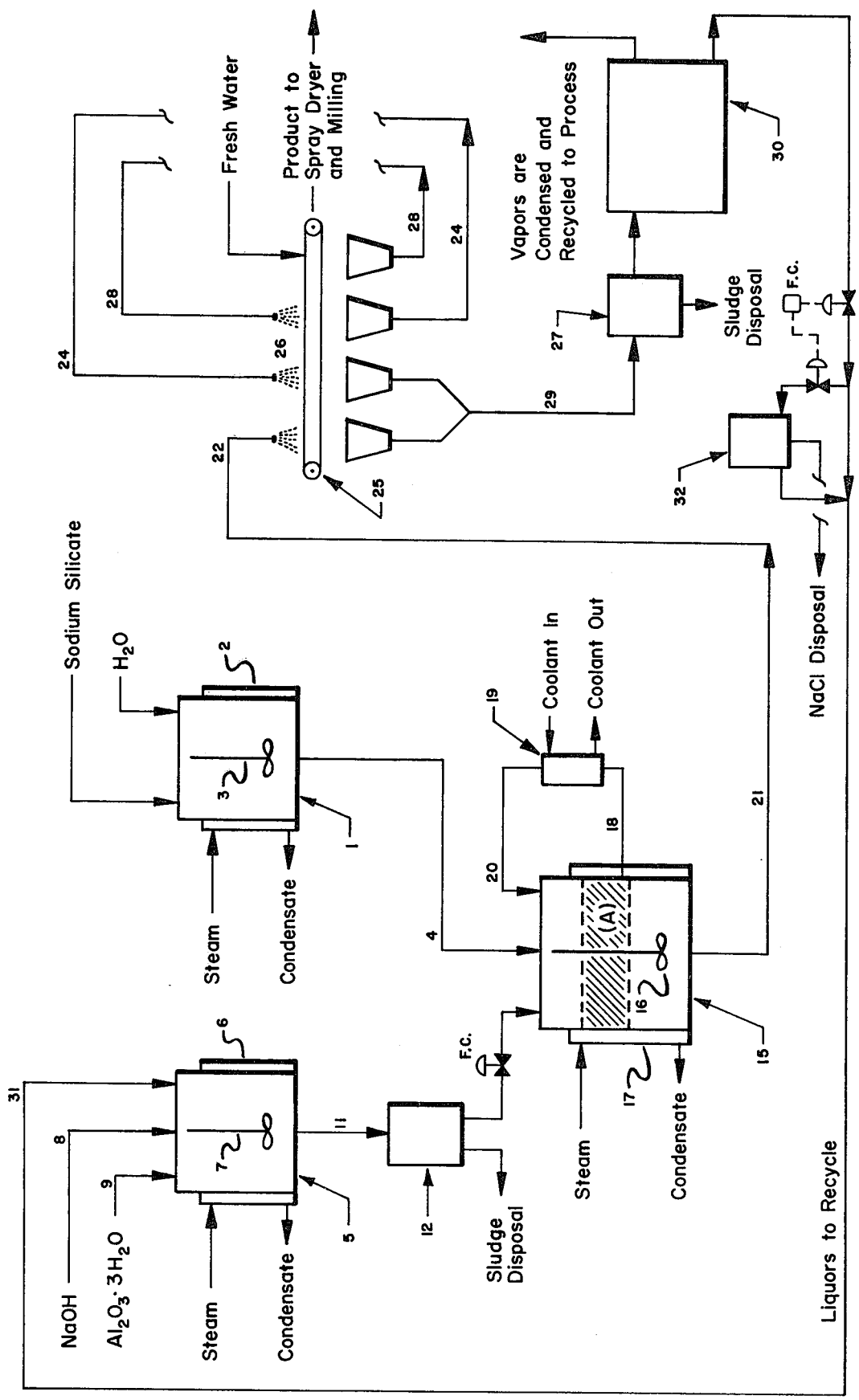
FIG. 1 is a diagrammatic illustration of a suitable arrangement of apparatus for carrying out a particularly advantageous method embodiment of the invention.
Figure 2:
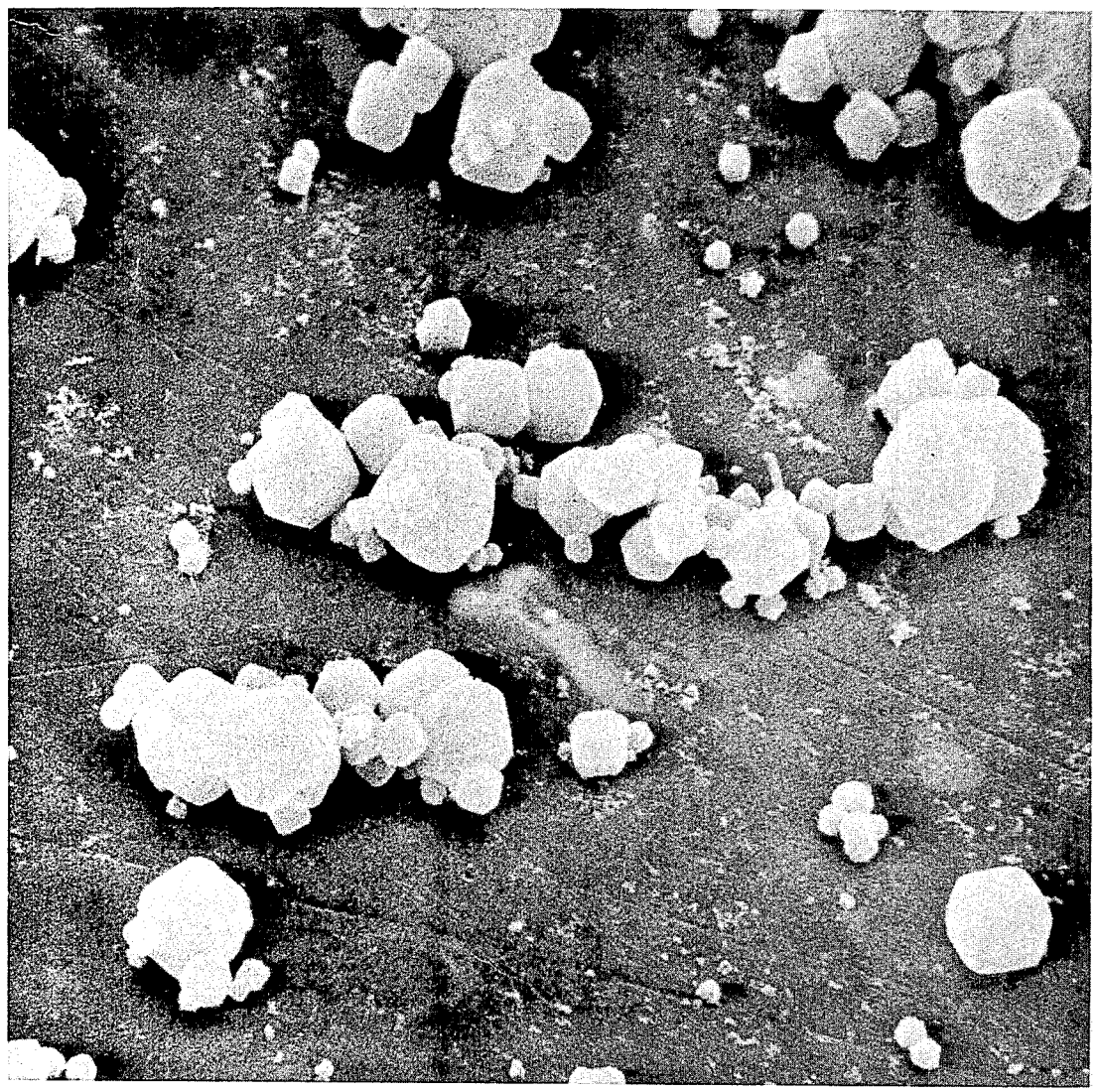
FIGS. 2, 3, and 4 are scanning electron micrographs showing examples of some of the range of crystal sizes that can be obtained by the practice of the present invention.
Figure 3:
Figure 4:
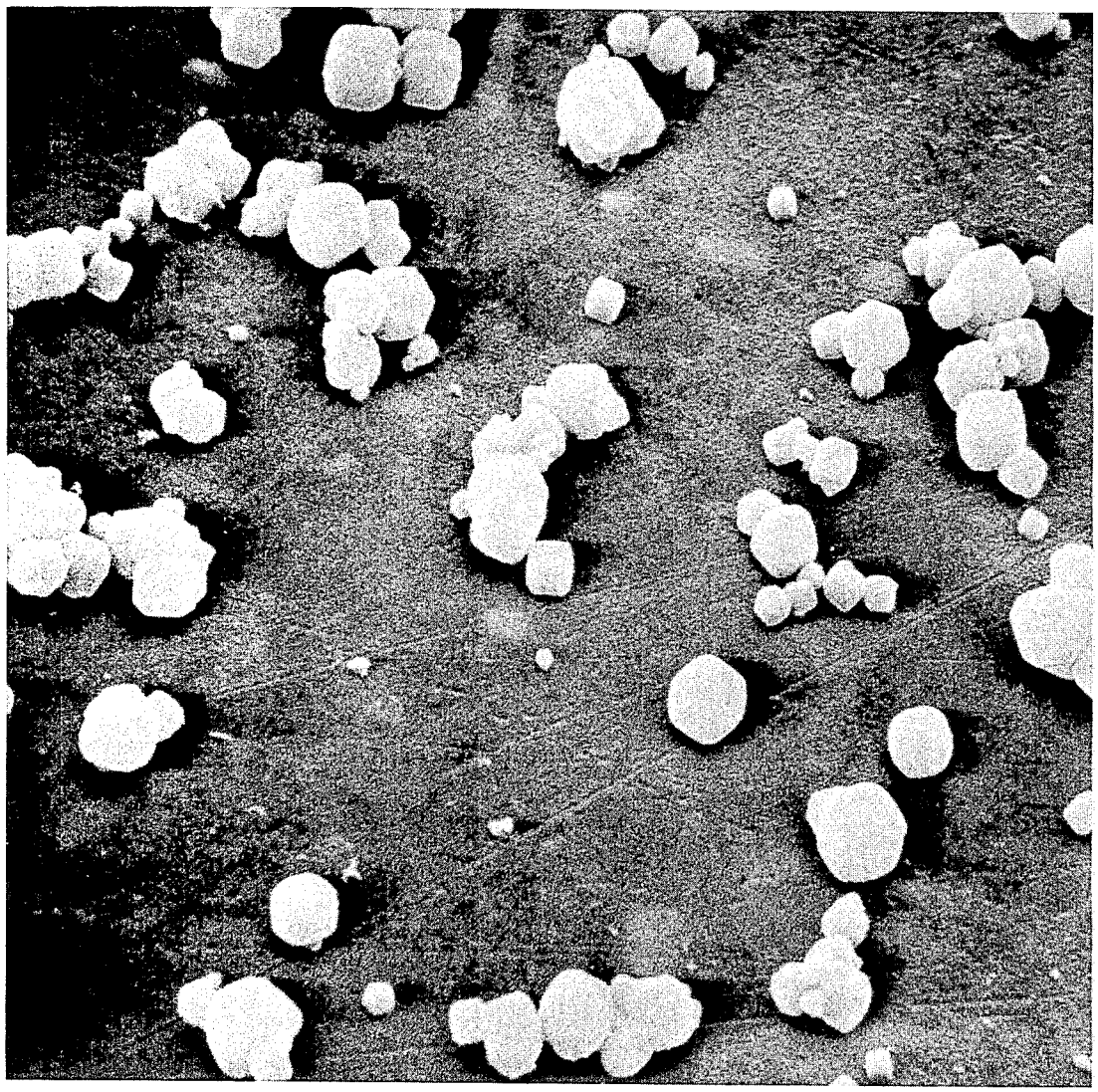
Figure 5:
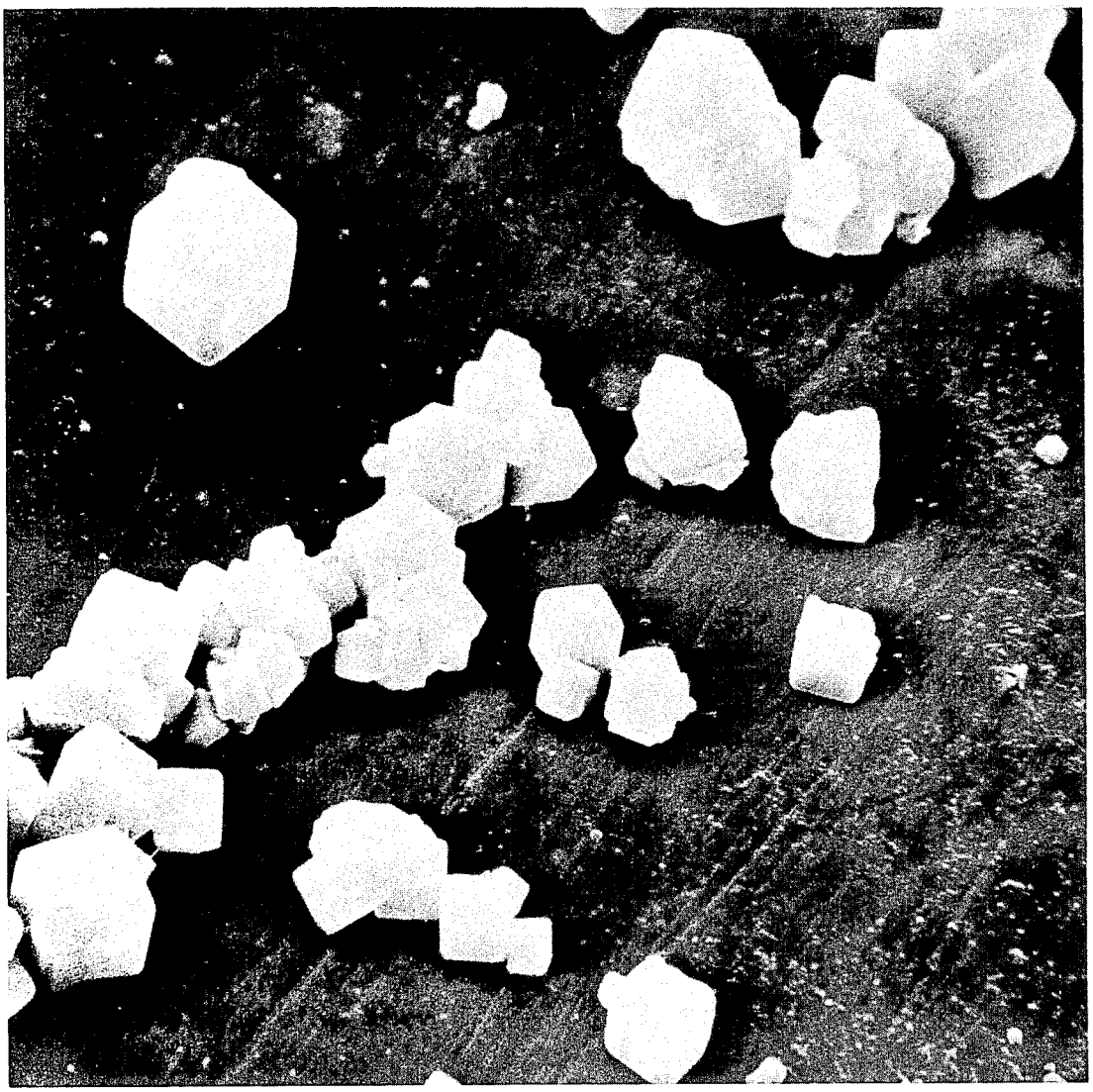
FIG. 5 is a scanning electron micrograph of a prior art zeolite known as Zeolite A.

As discussed above, the present invention relates to the production of synthetic alumino silicates which have high base or cation exchange characteristics. In the practice of the invention the crystalline product is produced by preparing an aqueous solution of an alkali metal silicate and introducing this solution into a reaction vessel provided with suitable agitation and heating means. The silicate should be such that it has an $SiO_2/X_2O$ mole ratio from 1 to 4, wherein X is an alkali metal such as sodium, potassium, or lithium. The silicate solution should be of from about 3 molar or lower concentration, and preferably less than 1 molar, and is preheated to a temperature on the order of from between about 70° to 180° F.

Thereafter, a solution of an alkali metal aluminate, such as sodium aluminate, is introduced into the silicate solution. The concentration of the aluminate solution should be on the order of about 4 molar or less, and preferably less than 2 molar. The aluminate should have an $X_2O/Al_2O_3$ mole ratio of from about 1 to 6 wherein X is an alkali metal. The alkali metal aluminate is also heated, preferably on the order of from between about 70° to 180° F. Specific concentrations of the solution of the reactants and the overall reaction mixture is given hereinbelow.

The pH of the reaction mass comprising the silicate and aluminate must be maintained above about 10.0 during the precipitation and preferably on the order of from between about 10 to 14. NaOH may be premixed with the aluminate solution to control the pH. Agitation should also be maintained throughout the precipitation. The precipitation temperature should be maintained in the range of from between about 70° to 180° F. and preferably on the order of between about 80° to 160° F. The latter range is one of the significant process parameters in controlling the final crystal size.

Upon completion of the reaction, the precipitate is crystallized, either dynamically or statically, and is separated and recovered from the mother liquor. In a particularly advantageous embodiment, this involves solids separation uniquely combined with countercurrent washing. The filtrate liquors (from the solid separation and washing step) are concentrated, as by evaporation; are processed to remove salt impurities, such as NaCl, organic discoloring complexes, ferruginous sludge; and are then recycled to the alkali metal aluminate make-up vessel.

As noted, the formation of a gel structure is prevented in the practice of the invention. This is achieved by control of the reaction or precipitation variables. It is important to note at this point that in a precipitate individual particles aggregate into super-colloidal groups which appear in the solution as visible aggregates or precipitates. With gels, the particles aggregate so that they fill the whole solution and the volume of liquid is wholly occupied or immobilized within the gel structure.

The product recovered from the solids separation may be washed to remove water soluble impurities after which it is dried, preferably by spray drying. The dried product comprises a friable mass which can be easily comminuted into a fine powder.

Turning now to still further details of the invention, the reactants include: a source of silica, such as alkali metal silicate (preferably sodium silicate), and a source of alumina which is supplied as an alkali metal aluminate. Sodium hydroxide may be employed in the regulation of the pH. The alkali metal silicate is employed as a dilute solution thereof with the composition of the silicate solution being within the ranges of from about 1 to 7% $Na_2O$ and 6 to 12% $SiO_2$. The aluminate is also preferably employed as a dilute solution thereof with the solution having a composition of from between about 8 to 14% $Na_2O$ and 9 to 15% $Al_2O_3$. Preferred ranges comprise 10 to 14% $Na_2O$ and 9 to 13% $Al_2O_3$. The reaction involved in the practice of the present invention may be illustrated by the following typical equations:

$$[a\ Na_2O \cdot b\ Al_2O_3] + [c\ Na_2O \cdot d\ SiO_2] + e\ H_2O \longrightarrow$$

$$[Na_2O \cdot Al_2O_3 \cdot 2\ SiO_2 \cdot x\ H_2O] + [f\ Na_2O \cdot g\ Al_2O_3] + h\ H_2O$$

where $x = 2$ to $7$

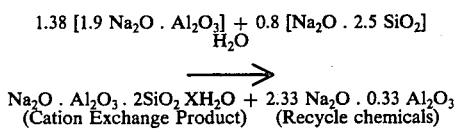

For example, a preferred reaction is:

$$1.38 \, [1.9 \, Na_2O \cdot Al_2O_3] + 0.8 \, [Na_2O \cdot 2.5 \, SiO_2] \xrightarrow{H_2O}$$

$$\underset{\text{(Cation Exchange Product)}}{Na_2O \cdot Al_2O_3 \cdot 2SiO_2 \, XH_2O} + \underset{\text{(Recycle chemicals)}}{2.33 \, Na_2O \cdot 0.33 \, Al_2O_3}$$

wherein X = 2 to 7.

With reference now to FIG. 1, the sodium silicate solution is made up in a vessel indicated generally at 1, said vessel having a steam jacket 2 and suitable agitation means 3. The silicate solution may be prepared by simply introducing the silicate and water into the vessel until the concentration is that as discussed hereinabove. The silicate may be added as a solid or may be supplied to the vessel 1 as a concentrated solution thereof. Additional alkali metal oxide may be added to the vessel 1 to obtain and/or adjust the $SiO_2/Na_2O$ ratio to within the operable range. The aqueous silicate solution, prior to its introduction into the precipitation vessel through conduit 4, may be heated to a temperature on the order of from between about 70° to 180° F. The silicate solution may also be heated after its introduction into the precipitation-digestion vessel 15 having a steam jacket 17.

The alkali metal aluminate is made up in a suitable vessel indicated generally at 5. This vessel also includes heating and agitation means indicated generally at 6 and 7, respectively. As to the formation of the aluminate, the recycled liquors, sodium hydroxide and alumina trihydrate are introduced by way of conduits 31, 8, and 9, respectively, into the make-up vessel 5 while maintaining intimate mixing or agitation. As to be discussed in more detail hereinbelow, the recycled liquors serve to provide a source of $Al_2O_3$ and $Na_2O$. The aluminate batch mixture should be subjected to this continuous agitation for a period of on the order of about 20 minutes while the solution is maintained at a temperature in the range of between about 200° to 250° F.

In the practice of the invention and again with reference to FIG. 1, the aqueous or alkali metal silicate solution is first introduced from the make-up vessel 1 through conduit 4 to the precipitation-digestion vessel 15. As indicated previously, the silicate must be at a temperature in the range of from between about 70° to 180° F and can be preheated in vessel 1 or heated in vessel 15. The solution of the alkali metal aluminate is then passed from the make-up vessel 5 through conduit 11, a purification mechanism 12 and then into the vessel 15. This purification step is very significant because it removes iron and vegetative organic complexes which interfere with the development and formation of the proper crystal species. Crystal species and purity are critical parameters of product functionality and performance. During the addition of the purified aluminate solution, the precipitating temperature must be maintained in the range of from between about 70° to 180° F. This may require heating or cooling of the aluminate. Continuous agitation is provided in the vessel 15 throughout the addition of the silicate and the subsequent addition of the aluminate. As indicated above, a critical aspect of the invention is the sequence of the addition of the reactants. Thus, the reactants (i.e., the silicate and aluminate) may not be simply admixed but must be commingled in a manner such that the proportions of the individual reactive ionic species in the reaction zone has a predetermined concentration range. The sequence of addition involves, as aforesaid, the introduction of the aluminate into the silicate solution.

The aluminate is added to the silicate solution at a controlled rate such that the time of addition is not less than 10 minutes or more than 60 minutes. The precipitation-digestion vessel 15 is provided with an agitation means 16 to subject the aqueous reaction mass to continuous mixing. The ultimate crystal size is controlled, to a considerable extent, by the degree of mixing during the precipitation phase.

The composition of the reaction mixture, expressed in terms of the oxide mole ratio of the aqueous reaction materials from which the synthetic crystalline base exchange materials of the present invention are produced, is as follows:

$X_2O/SiO_2$ ratio from 1.0 to 3.0 and an
$H_2O/X_2O$ ratio from 35 to 200 when the
$SiO_2/Al_2O_3$ ratio is from 0.5 to 1.3;
$X_2O/SiO_2$ ratio from 0.8 to 3.0 and an
$H_2O/X_2O$ ratio from 35 to 200 when the
$SiO_2/Al_2O_3$ ratio is from 1.3 to 2.5 where X is an alkali metal cation selected from the group consisting of sodium, potassium and lithium.

After the precipitation is complete, the crystallization phase is initiated in vessel 15 by heating the reaction mass to a temperature on the order of from about 170° to 230° F. This phase is continued, under either static or dynamic conditions, for a period of time on the order of about 1 to 8 hours. It should be understood that the inherent variations within these conditions control the crystal species, size, and purity.

The aqueous mass containing the crystallized product is next subjected to decanting and quenching. In this regard, decanting may comprise removing supernatant mother liquid (A) from the vessel 15 through conduit 18. The supernatant is passed through a heat exchanger 19 wherein it is cooled and returned to vessel 15 through the conduit 20. Prior to decanting, the mass containing the crystallized product may be allowed to settle to form the supernatant phase. The quenching is significant to avoid spurious crystalline phases (as, for example, hydroxy sodalite) and to control crystal growth. Following quenching, the aqueous mass is then passed through conduit 21 to a solids separation zone consisting of a continuous porous belt 25. Controlled vacuum is applied to various sections of the belt by a suitable vacuum source (not shown). The aqueous mixture is fed onto the belt at a controlled rate through a distribution device 22. After formation of a cake of the alumino-silicate crystalline material on the belt 25 and collection of the mother liquor, the cake is contacted with recycle wash water which issues from distribution headers indicated at 26. This yields a weak liquor filtrate which is combined with the mother liquid yielding filtrate liquors which pass through conduit 29, a sludge removal unit 27 and then to a concentrator 30. Fresh wash water is distributed onto the cake just prior to the discharge end of the belt. As shown in the drawings, the fresh water wash becomes the recycle wash through conduits 24 and 28 and distribution headers 26. The concentration unit may comprise single or multiple stage evaporators indicated at 30. In this unit the filtrate liquors are concentrated to the extent that controlled amounts of water are removed to maintain the entire system in balance on a volume basis. In this manner all the chemical values of the liquors can be recycled, thus reducing raw material cost and avoiding pollution by eliminating waste liquor effluents and similar disposal problems.

The wet cake, recovered from the continuous belt 25, is collected and pumped (or conveyed by other means) to a suitable drying unit as, for example, a spray dryer. The product may then be milled and packaged. The particular equipment employed to dry and mill the product may be of any conventional design as is well known in the art.

As discussed above, the present invention embodies the concept of a total closed system involving the recycle of the process liquors. Thus, following the concentration of the filtrate liquors (in the evaporator 30), the concentrated liquors comprising the recovered chemical values are recycled via conduit 31 to the alkali metal aluminate make-up tank 5. In this regard, however, the concentrated mass is first passed through a purge unit 32 wherein sodium chloride (if the alkali metal is sodium) is removed. The purge unit may utilize membrane-type cells, fractional crystallization, or similar units, etc., as is well known in the art.

The necessity of the above purge arises from the fact that the commercial grade raw materials of the present invention are typically produced in processes which give rise to halide (usually chloride) contamination of the raw materials. Recycling without adverse effects on the process is possible only if the halide (chloride) impurities are removed.

As used herein, the term "high total exchange capacity(ies)" refers to materials having a total exchange capacity of at least 250 mg $CaCO_3$ per gram of crystalline inorganic base exchange material. The materials of the present invention have an initial hardness exchange rate of at least 2 grains per gram per minute and are capable of reducing a normal hardness water to a level of less than 0.3 grains/gallon.

The materials of the present invention have a mean crystal size in the range of from 0.25 to 8.0 microns, a high exchange affinity for trace metal elements, and are capable of producing residual concentrations of said trace metals on the order of parts per billion.

As used herein, the term "crystallation" is intended to be understood as synonymous with "crystallization."

Further, it is, to be understood that the terms "quench," "quenching," and the like include rapid continuous processing, immediate processing to remove equilibrium liquors, cooling and/or the process of rapidly decanting the supernatant mother liquor and similar equivalent procedures for stopping crystalline growth and preventing the formation of spurious crystalline phases.

As should be readily appreciated by those skilled in the art, the present invention provides a process that is readily adaptable for economical operation; provides for total recycle of the process liquors to recover the chemical values therefrom; and because no gel is formed, is streamlined and involves straightforward, yet highly effective and practical (from the commercial standpoint) processing steps.

Although a specific preferred embodiment of the present invention has been disclosed in the detailed description above, this description is not intended to limit the invention to the particular forms and embodiments disclosed herein. The present description is to be recognized as illustrative rather than restrictive, and it will be obvious to those skilled in the art that the invention is not so limited. The invention is thus declared to all changes and modifications of the specific examples and embodiments of the invention herein disclosed for purposes of illustration, which do not constitute departures from the spirit and scope of the invention defined by the appended claims.

What is claimed is:

1. A method for producing crystalline base exchange alumino silicate materials having high total ion exchange capacities and specific initial exchange rates, said method comprising the steps of:
   a. preparing an aqueous solution of alkali metal silicate, said silicate having an $SiO_2/X_2O$ mole ratio of from about 1 to 4, wherein X is an alkali metal;
   b. subjecting said solution to vigorous agitation and adding to said solution at a controlled rate a clarified aqueous solution of an alkali metal aluminate, said clarified alkali metal aluminate solution being substantially free of halide impurities, organic discoloring complexes and ferruginous sludge;
   c. continuing the vigorous agitation of the reaction mass formed by the addition of said alkali metal aluminate to said alkali metal silicate solution while maintaining the temperature of said reaction mass in the range of between 70° and 180° F. and the pH of said reaction mass at a level of at least 10.0;
   d. precipitating a finely divided pigmentary amorphous alkali metal alumino silicate intermediate in the substantial absence of gel formation;
   e. crystallizing the precipitated intermediate in the reaction mass by maintaining the mass at a temperature on the order of from 170° to 230° F.;
   f. quenching the reaction mass containing the crystalline product to prevent further crystallization thereof;
   g. separating and recovering the solid crystalline base exchange alumino silicate material from the reaction mass to provide aqueous process liquids containing alkali metal aluminate values;
   h. treating said aqueous process liquids to remove halide impurities, organic discoloring complexes and ferruginous sludge, and adjusting to the desired concentration to form clarified aqueous process liquids of suitable concentration to serve as a source of alkali metal aluminate in the initial reaction; and
   i. recycling the resulting clarified aqueous process liquids to step (b) for addition to said alkali metal silicate solution as a source of the alkali metal aluminate.

2. The method in accordance with claim 1 wherein the speed of said agitation of the reaction mass during the production of the amorphous alkali metal alumino silicate intermediate is varied to control the mean crystal size of the product in the range of from 0.25 to 8.0 microns.

3. The method in accordance with claim 1 wherein the crystallization of the precipitated intermediate is performed under dynamic conditions to control the mean crystal size of the product from 0.25 to 8.0 microns.

4. The method in accordance with claim 1 wherein the solids separation by which the crystallized product is recovered from the aqueous reaction mass comprises passing said reaction mass containing the crystalline product onto the front end of a continuous, porous, rotating belt and contacting the crystalline product collected on said belt with a wash liquid, at least a portion of said wash liquid comprising recycled liquors collected from the filtrate liquid recovered near the intermediate and second end of said continuous belt.

5. The method of claim 1 wherein the said alkali metal silicate solution has an initial concentration of not more than 1 molar.

6. The method of claim 1 wherein the said alkali metal silicate and alkali metal aluminate solution are preheated to a temperature of from 70° to 180° F.

7. The method of claim 1 wherein the said alkali metal aluminate has an initial concentration of not more than 4 molar.

8. The method of claim 1 wherein the pH of the said aqueous mixture is maintained from 10.0 to 14.0 during precipitation of the amorphous alumino silicate intermediate.

9. The method of claim 8 wherein the pH is maintained by the addition of alkali metal hydroxide premixed with the aluminate solution.

10. The method of claim 1 wherein the alkali metal silicate solution has a composition of from 1 to 7% $Na_2O$ and 6 to 12% $SiO_2$, and the alkali metal aluminate solution has a composition of from 8 to 14% $Na_2O$ and from 9 to 15% $Al_2O_3$.

11. The method of claim 1 wherein the alkali metal aluminate batch mixture is subjected to continuous intimate mixing and agitation for a period on the order of 20 minutes while the solution is maintained at a temperature of from 200° to 250° F. prior to addition of said silicate solution.

12. The method of claim 1 wherein the said aluminate is added to the said silicate solution at a controlled rate such that the time of addition is not less than 10 minutes nor greater than 60 minutes.

13. The method of claim 1 wherein the crystallizing of said precipitated amorphous intermediate is carried out at a temperature of from 170° to 230° F. over a period of time from 1 to 8 hours.

14. The method of claim 1 wherein the separated solid crystalline product is washed by countercurrent flow of wash liquid.

15. A method for producing crystalline base exchange alumino silicate materials having high total ion exchange capacities, specific initial exchange rates which yield well-defined residual concentrations for the elements of Group II of the Periodic Table and trace metals, and a crystal size in the range of from 0.25 to 8.0 microns, said method comprising the steps of:

a. preparing an aqueous solution of an alkali metal silicate, said silicate having an $SiO_2/X_2O$ mole ratio of from 1 to 4, wherein X is an alkali metal selected from the group consisting of sodium, potassium and lithium;

b. introducing said alkali metal silicate solution into a precipitation-digestion vessel and subjecting to vigorous agitation;

c. preparing an aqueous solution of an alkali metal aluminate, separating organic complexes and ferruginous sludges from said aluminate solution to form a clarified aluminate solution;

d. introducing said aluminate solution into the alkali metal silicate solution at a controlled rate while subjecting the resulting aqueous mixture to vigorous agitation at a temperature of between about 70° and 180° F.;

e. continuing the vigorous agitation of said aqueous mixture, said resulting aqueous mixture comprising an alkali metal alumino silicate/water mixture whose composition, expressed in terms of oxide-mole ratios, is as follows:
$X_2O/SiO_2$ ratio from 1.0 to 3.0 and an
$H_2O/X_2O$ ratio from 35 to 200 when the
$SiO_2/Al_2O_3$ ratio is from 0.5 to 1.3;
$X_2O/SiO_2$ ratio from 0.8 to 3.0 and an
$H_2O/X_2O$ ratio from 35 to 200 when the
$SiO_2/Al_2O_3$ ratio is from 1.3 to 2.5;

f. maintaining the pH of the said aqueous mixture at a level of at least 10.0 and a temperature between about 70° and 180° C. to thereby precipitate a finely divided pigmentary amorphous alumino silicate intermediate in the substantial absence of gel formation;

g. crystallizing said precipitated intermediate by heating the aqueous mixture containing said precipitate to a temperature in the range of from 170° to 230° F.;

h. withdrawing the supernatant mother liquor formed on the top portion of said aqueous mass containing the crystallized product from the precipitation-digestion vessel;

i. passing said supernatant mother liquor through cooling means and thereafter returning the thus-cooled mother liquor to the aqueous mass containing the crystallized product to thereby quench and cool the same to arrest further crystal growth, and produce said crystalline base exchange alumino silicate material having a predetermined crystalline structure;

j. recovering the crystallized product from the aqueous mass by passing said mass onto the front end of a continuous, porous, rotating belt to thereby form, on said rotating belt, a wet cake of the crystalline product;

k. contacting the wet cake of the crystallized product on said belt with a wash liquid, at least a portion of said wash liquid comprising recycled liquors collected from filtrate liquids recovered near the intermediate and second end portion of said continuous belt;

l. recovering and drying the wet cake comprising the crystalline alumino silicate from the said end portion of said continuous belt;

m. collecting and combining the process liquors from said belt; removing ferruginous sludges and negative organic complexes from said process liquors;

n. concentrating said process liquors to remove water therefrom; passing said concentrated liquors into a purification zone to remove alkali metal chlorides therefrom; and o. recycling the concentrated process liquors to the vessel in which the alkali metal aluminate solution is prepared, said recycle process liquors providing a source of clarified alkali metal aluminate employed in the precipitation of the said alumino silicate intermediate.

16. A method for producing crystalline base exchange alumino silicate materials having high total ion exchange capacities, including a total exchange capacity of at least 250 mg. $CaCO_3$ per gram of crystalline inorganic base exchange material; specific initial exchange rates which yield well-defined residual concentrations for the elements of Group II of the Periodic Table and for trace metals, including an initial exchange rate of at least 2 grains per gram per minute, being capable of reducing a normal hardness water to a level of less than 0.3 grain/gallon and being capable of producing residual concentration of trace metals on the order of parts per billion, and having a crystal size in the range of from 0.25 to 8.0 microns, said method comprising the steps of:

a. preparing an aqueous solution of an alkali metal silicate, said silicate having an $SiO_2/X_2O$ mole ratio of from 1.0 to 4.0, wherein X is an alkali metal selected from the group consisting of sodium, potassium and lithium;

b. introducing said alkali metal silicate solution into a precipitation-digestion vessel;

c. preparing an aqueous solution of an alkali metal aluminate, said aluminate having an $X_2O/Al_2O_3$ mole ratio of from 1.0 to 6.0 wherein X is an alkali metal selected from the group consisting of sodium, potassium, and lithium;

d. separating ferruginous sludges and vegetative organic complexes from said aluminate solution to form a clarified aluminate solution;

e. introducing said aluminate solution into the alkali metal silicate solution at a controlled rate while subjecting the resulting aqueous mixture to vigorous agitation at a temperature of between about 70° and 180° F.;

f. continuing the vigorous agitation of the mixture formed by the addition of said aluminate solution to said silicate solution, said mixture comprising an alkali metal alumino silicate/water mixture whose reaction composition, expressed in terms of oxide-mole ratios, is as follows:

$$[a\, X_2O \cdot b\, Al_2O_3] + [c\, X_2O \cdot d\, SiO_2] + 3\, H_2O \longrightarrow$$

$$[X_2O \cdot Al_2O_3 \cdot 2SiO_2 \cdot x\, H_2O] + [f X_2O \cdot g\, Al_2O_3] + h\, H_2O$$

where $x = 2.0$ to $7.0$

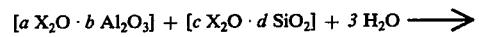

when $\dfrac{SiO_2}{Al_2O_3} = \dfrac{d}{b} = 0.5$ to $1.3$ and where

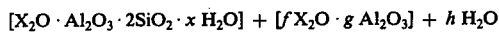

when $\dfrac{SiO_2}{Al_2O_3} = \dfrac{d}{b}$ 1.3 to 2.5;

g. maintaining the pH of the said aqueous mixture at a level of at least 10.0 and the temperature between about 70° and 180° C. to thereby precipitate a finely divided pigmentary amorphous alumino silicate intermediate in the substantial absence of gel formation;

h. crystallizing said precipitated intermediate by heating the aqueous mixture containing said precipitate to a temperature in the range of from 170° to 230° F. over a period of 1 to 8 hours;

i. withdrawing the supernatant mother liquor formed on the top portion of said aqueous mass containing the crystallized product from the precipitation-digestion vessel;

j. passing said supernatant through cooling means and thereafter returning the thus-cooled mother liquor to the aqueous mass containing the crystallized product to thereby quench and cool the same to arrest further crystal growth, and to produce said crystalline base exchange alumino silicate material having high total ion exchange capacities and crystal size in the range of from 0.25 to 8.0 microns;

k. recovering the crystallized product from the aqueous mass by passing said mass onto the front end of a continuous, porous, rotating belt to thereby form, on said rotating belt, a wet cake of the crystalline product;

l. contacting the wet cake of the crystallized product on said belt with a wash liquid, at least a portion of said wash liquid comprising recycled liquors collected from filtrate liquids recovered near the intermediate and second end portion of said continuous belt;

m. recovering and drying the wet cake comprising the crystalline alumino silicate from the said second end portion of said continuous belt;

n. collecting and combining the process liquors from said belt;

o. removing ferruginous sludges and vegetative organic complexes from said process liquors;

p. concentrating said process liquors to remove water therefrom;

q. passing said concentrated liquors into a purification zone to remove impurities including alkali metal chlorides and halide salts therefrom; and r. recycling the concentrated process liquors to the vessel in which the alkali metal aluminate solution is prepared, said recycle process liquors providing a source of alkali metal aluminate employed in the precipitation of the said alumino silicate intermediate.

17. The method of claim 16 wherein the alkali metal silicate solution has a composition of from 1 to 7% $Na_2O$ and 6 to 12% $SiO_2$.

18. The method of claim 17 wherein the alkali metal aluminate solution has a composition of from 8 to 14% $Na_2O$ and from 9 to 15% $Al_2O_3$ and wherein the alkali metal aluminate batch mixture is subjected to continuous intimate mixing and agitation for a period on the order of 20 minutes while the solution is maintained at a temperature of from 200° to 250° F. prior to addition to said silicate solution.

19. The method of claim 16 wherein the said aluminate is added to the said silicate solution at a controlled rate such that the time of addition is not less than 10 minutes nor greater than 60 minutes.

20. The method of claim 16 wherein the alkali metal aluminate batch mixture is subjected to continuous intimate mixing and agitation for a period on the order of 20 minutes while the solution is maintained at a temperature of from 200 to 250° F.; the alkali metal aluminate is brought to a temperature of from 70° to 180° F. before being added into the alkali metal silicate reaction solution; said alkali metal aluminate solution has an initial concentration of not more than 2 molar and a composition of from 10 to 14% $Na_2O$ and from 9 to 13% $Al_2O_3$;

the said aluminate is added to said silicate solution, said silicate solution having an initial concentration of not more than 1 molar, a concentration of from 1 to 7% $Na_2O$ and 6 to 12% $SiO_2$, and being preheated to from 70° to 180° F. at a controlled rate such that the time of addition is not less than 10 minutes nor greater than 60 minutes; the pH of the said aqueous mixture is maintained from 10.0 to 14.0 during the precipitation of the amorphous alumino silicate intermediate by premixture of NaOH with said aluminate solution and the precipitation temperature is maintained between 80 to 160° F.; said aqueous reaction mass is subjected to continuous mixing during and throughout precipitation to control the ultimate crystal size; the crystallizing of said precipitated intermediate is carried out at a temperature of from 170° to 230° F. over a period of time from 1 to 8 hours; and the washing of said wet cake is by countercurrent flow of said wash liquid.

* * * * *

UNITED STATES PATENT OFFICE
CERTIFICATE OF CORRECTION

PATENT NO. : 4,041,135
DATED : August 9, 1977
INVENTOR(S) : LLOYD E. WILLIAMS; ROBERT K. MAYS; and JOSEPH E. WAGNER, III It is certified that error appears in the above-identified patent and that said Letters Patent are hereby corrected as shown below:

Column 5, line 10, following "$\frac{d}{b}$", the equal symbol -- = -- should be inserted.

Column 5, line 15, at the beginning of equation "1.38" should be -- 1.33 --.

Column 8, line 21 (fifth line of Claim 1), following "solution of" the word -- an -- should be inserted.

Column 11, line 45, just preceding the "⟶" in the equation, "$3H_2O$" should be -- e $H_2O$ --.

Column 11, line 50, following "$\frac{a + c}{d}$", the equal symbol -- = -- should be inserted.

Column 11, line 57, following "$\frac{d}{b}$", the equal symbol -- = -- should be inserted.

Signed and Sealed this

Sixth Day of December 1977

[SEAL]

Attest:

RUTH C. MASON
*Attesting Officer*

LUTRELLE F. PARKER
*Acting Commissioner of Patents and Trademarks*